Feb. 10, 1925.

E. A. SPERRY 1,525,963

SHOAL WATER INDICATOR AND SHIP'S LOG

Filed Feb. 12, 1919    5 Sheets-Sheet 1

Feb. 10, 1925.

E. A. SPERRY 1,525,963

SHOAL WATER INDICATOR AND SHIP'S LOG

Filed Feb. 12, 1919    5 Sheets-Sheet 3

INVENTOR
BY *Elmer A. Sperry*
*Herbert H. Thompson*
his ATTORNEY.

Feb. 10, 1925.

E. A. SPERRY 1,525,963

SHOAL WATER INDICATOR AND SHIP'S LOG

Filed Feb. 12, 1919   5 Sheets-Sheet 4

INVENTOR
ELMER A. SPERRY
BY Herbert H. Thompson
his ATTORNEY

Patented Feb. 10, 1925.

1,525,963

UNITED STATES PATENT OFFICE.

ELMER A. SPERRY, OF BROOKLYN, NEW YORK.

SHOAL-WATER INDICATOR AND SHIP'S LOG.

Application filed February 12, 1919.   Serial No. 276,594.

*To all whom it may concern:*

Be it known that I, ELMER A. SPERRY, a citizen of the United States of America, residing at 1505 Albemarle Road, Brooklyn, New York, in the county of Kings and State of New York, have invented a certain new and useful Improvement in Shoal-Water Indicator and Ship's Log, of which the following is a specification.

This invention relates to means for continuously indicating the depth of water in which a vessel is running without the necessity for taking soundings or other observations. Recent researches in marine engineering have shown that the amount of power required to drive a given vessel at a predetermined speed varies materially with the depth of water under the keel within certain limits. For each vessel, of course, the characteristics are different but beyond a certain depth, dependent on the size and speed of the vessel, the resistance becomes substantially constant. As the water becomes more shallow the resistance increases at an increasing rate and even for comparatively low speeds, more than doubles before the water becomes dangerously shallow. For higher speeds the increase in resistance is even more marked.

The object of my invention is to make use of the variation in the relation between the power to drive the ship and the speed thereof for actuating a depth indicator or alarm. The invention has also an object in improving ships' logs and speed indicators. Further objects of the invention will become apparent as the description proceeds.

Referring to the drawings in which what are now considered the preferred forms of the invention are shown.

Figure 12:
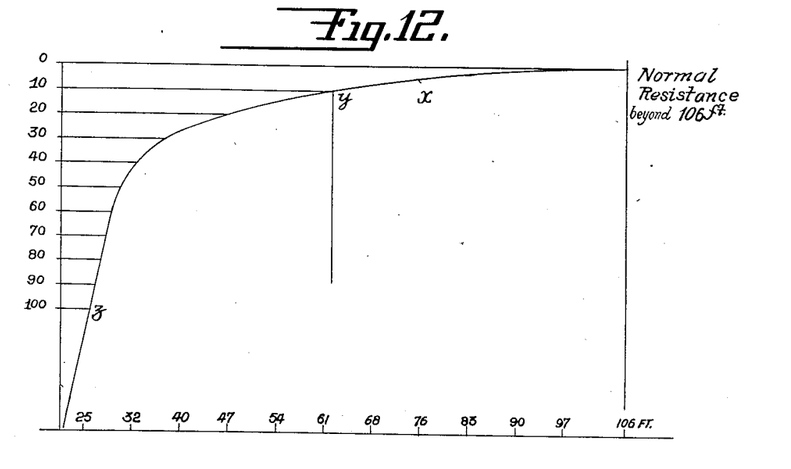
Fig. 12 is a diagram illustrating the variation of the resistances of the ship with the depth of the water.

In Fig. 12 the abscissæ represent the depth of water in feet and the ordinates per cent resistance above normal. This particular curve was plotted for a ship of moderate size travelling at a speed of 12 knots. The curve shows that for this ship the normal resistance was reached in a depth of water of about 106 feet beyond which depth the resistance remained substantially constant. Taking this resistance as zero, the curve X was plotted. From this curve it will be seen that when the depth of the water decreased to 61 feet the resistance increased 10% (point $y$ while beyond this point the resistance went rapidly up until at about 25 feet depth the resistance had increased 100% (point $z$). For higher speeds the increase in resistance is even more marked becoming for a 20 knot battleship approximately 200% for a 25 foot depth.

In order to make use of this remarkable variation in resistance according to the function of the depth of the water I prefer to make use of two tangible quantities by suitable instruments. The relative variations between them bring into action indicating or alarm mechanisms or both. One of the said instruments is a speed measuring device for measuring the actual speed of the vessel, preferably the speed through the water. The other is a device for furnishing an indication or measure of some function of the power or propelling equipment of the vessel.

Figure 1:
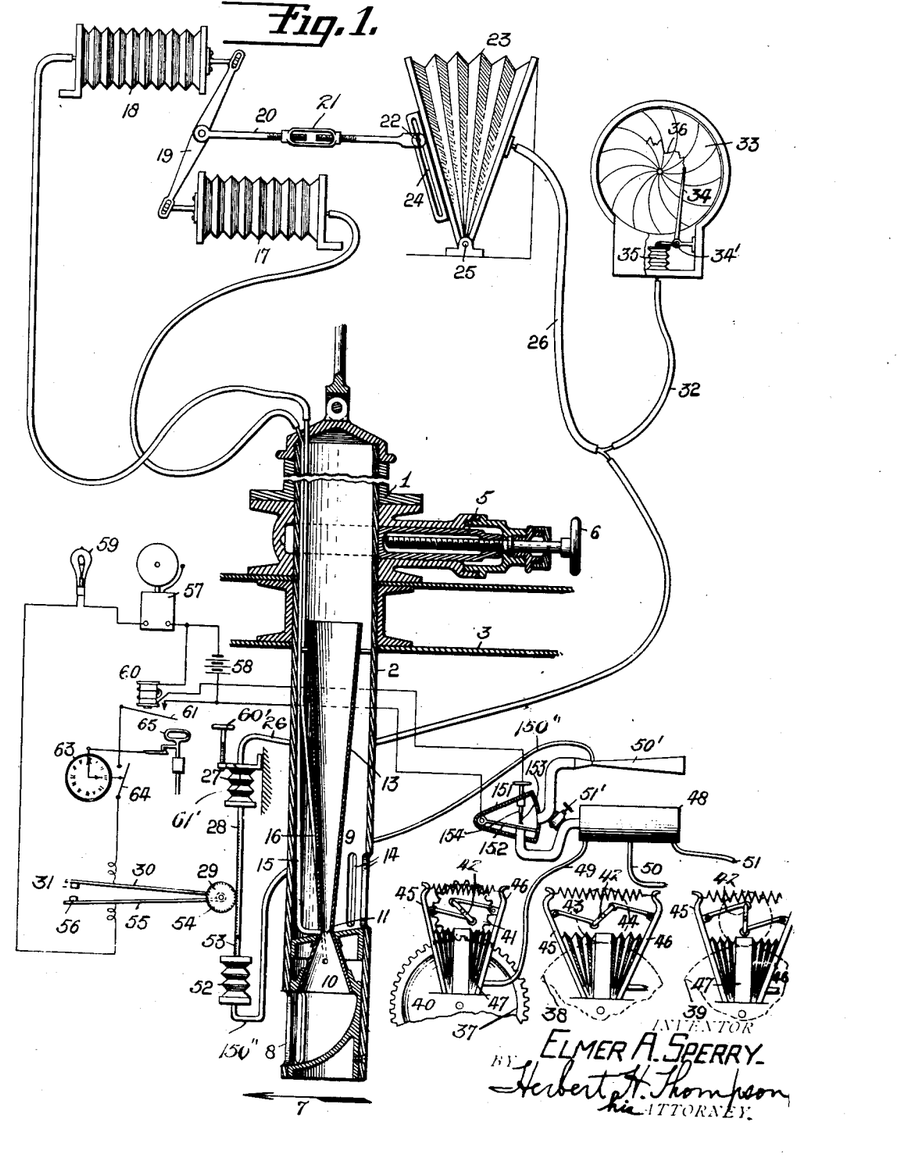
Fig. 1 is a diagrammatic view partly in section of an apparatus constructed to render an indication when the ship sails into shoal water.
Figure 10:
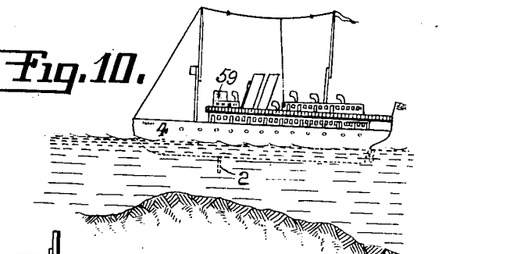
Fig. 10 is a view of the ship showing the application of the invention.
Figure 11:
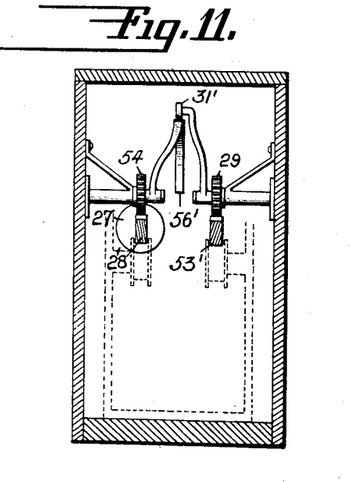
Fig. 11 is a section taken on line 11—11 of Fig. 7.

In Fig. 1 the speed measuring device is shown at 1 and comprises a tube 2 adapted to be projected below the bottom 3 of a vessel 4 in which it is mounted (see Fig. 10). The said tube may be entirely withdrawn within the vessel when not in use and the gate valve 5 closed by turning the handle 6. The tube is shown in the operative position with the vessel heading in the direction of the arrow 7. Adjacent the bottom of the tube is an opening 8 faced in the direction of the arrow and connected to a Venturi tube 9. The water entering the opening 8 flows up through the mouth 10 of the Venturi tube thence through its neck 11 and through the flaring tail 13 from where it overflows into the tube and flows back down the tube and out through openings 14. Small pressure transmitting tubes 15 and 16 are connected respectively with the interior of the throat of the Venturi tube and with another portion thereof. The former tube is connected to a sylphon 17 or other flexible walled container adapted to expand and contract in response to changes of pressure while the latter tube is connected to a similar sylphon 18. It is obvious that the position of the former sylphon 17 will vary inversely as the square of the speed of the water through the neck, while the position of the latter sylphon 18 will vary as the head of water on the tube, or in other words, as the existing draft of the vessel. A compensating link 19 connects the two sylphons while a second link 20 is connected to an intermediate portion of the link 19. Said link 20 is preferably adjustable as by means of a turn buckle 21 and is connected at 22 to a bellows 23 or other variable air pressure chamber. Preferably the link 20 is adjustable in a slotted member 24 secured to bellows 23 so that its point of connection to the bellows may be varied with respect to the pivot 25 and hence the degree of compression of the air for a given movement of the link 20 may be varied. The interior of the bellows 23 is connected as by means of a flexible pipe 26 to a sylphon 27. Said sylphon may have connected thereto a rack bar 28 which meshes with a gear 29 to which is secured an arm 30 having an electrical contact 31 thereon.

The bellows 23 may also be connected through a branch tube 32 to a recording barograph or similar instrument having a dial 33 continuously rotated by suitable clock work, not shown, and a marker 34, pivoted at 34', the position of which is governed by sylphon 35 connected to tube 32. It will readily be seen that the traced line 36 furnishes a record of the distance covered by the ship.

For measuring or furnishing an indication of the power consumed in driving the ship I may make use of the propeller shafts, the speeds of rotation of which will furnish an indication of the power delivered by the engines. Accordingly I have indicated three propeller shafts 37, 38, 39 of a triple screw steamship, each of which has a gear 40 secured thereto which meshes with a pinion 41. On the shaft of the said pinion is a double crank 42 connected by links 43 and 44 to two sides 45 and 46 of a double bellows 47. Each of said bellows may be connected to a storage or equalizing air tank 48 by means of pipes 49, 50, and 51. From the tank the air is led to a pressure measuring device which is preferably in the form of a Venturi tube 50' so that the same, or approximately the same, function may be transmitted in this instance as in the instance of the speed indicator. Between the tank 48 and the Venturi tube 50' I may place a valve 151 for a purpose hereinafter described. A by-pass valve 51' may lead around valve 151 if desired.

The throat of the Venturi tube is connected to a second sylphon 52 also having a rack bar 53 connected thereto which meshes with an adjacent pinion 54 having an arm 55 corresponding to arm 30 and a cooperating contact 56. Said arms are so arranged that they will advance or recede together upon corresponding variations in both the speed of revolution of the propellers and the speed of the ship, but as will be readily seen any relative increase in the speed of the propellers over the speed of the ship will cause an immediate closing of the contacts 31 and 56 thereby bringing into action an alarm. Said alarm may be in any suitable form such as an electric bell 57 actuated by a battery 58 or the like; or signal lamp 59, or both. At least one of the sylphons 27 is adjustable, as by means of a screw 60' threaded through the base 61' of sylphon 27, so that the relative position of the contacts may be readjusted for varying propeller speeds, conditions of the weather, etc. As is well known, a much larger power, in proportion is required to drive a ship at say 20 knots than at 15 knots.

Owing to the fact that in starting the ship the speed of the propeller shafts is greatly in excess of the speed of the ship I prefer to employ means for preventing actuation of the alarm until after the ship has attained approximately its normal speed. For this purpose I may employ a hinged plate 152 within a valve or casing 151. Said plate is forced upwardly against a spring contact 153 by the pressure within the tank 48 and closes a circuit including a retarded relay 60 which in turn closes the alarm circuit at 61. The contact 61 will be held closed, after once having been picked up, so long as there is a flow from the reservoir 48 to tube 50'. Or if desirable, I may employ a time lag device such as a clock 63 controlling a switch 64 in the alarm circuit. Said clock is preferably arranged to be started upon the sounding of the full speed ahead signal 65, for instance, and to close the switch 64 after an interval of time depending upon the characteristics of the ship upon which the device is mounted. Such clock mechanisms are well known and need not be described here in detail.

Figure 7:
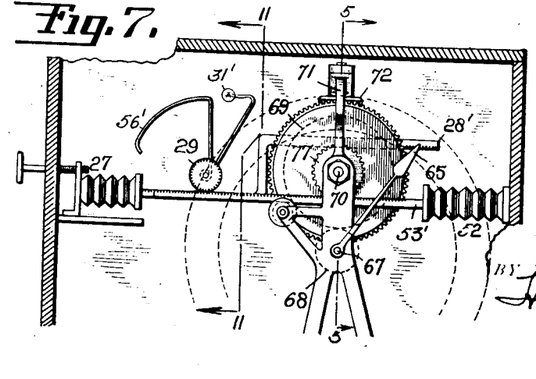
Fig. 7 is an interior view, partly in section, of the combined depth indicator and shoal water alarm.

In addition to giving an alarm indication on the approach of shoal water my invention may also serve as a depth indicator by actuating a suitable pointer 65 (Figs. 5, 6 and 7) over a properly graduated scale 66. Said pointer is shown as mounted on a shaft 67 having a pinion 68 meshing with the gear 69. Said gear is secured to a shaft 70 to which is also secured the middle arm 71 of differential bevel gear train 72. One bevel gear 74 is secured to a pinion 75 meshing with the rack bar 28', while the other bevel gear 76 is secured to a pinion 77 meshing with the corresponding rack bar 53'. It will be readily seen that the movements of the pointer will be responsive to the variations in the relative speed of the ship and power consumed and hence indicate the depth of water. It is, of course, preferable to mount both the depth indicator and the alarm actuator in the same instrument, as shown in Fig. 7. In this figure also the form of contacts is varied from that shown in Fig. 1, contact 56' being made in the form of a sector and contact 31' in the form of a brush or roller adapted to roll over the sector, the purpose being to maintain a contact while at the same time permitting one pointer to pass the other.

Figures 2, 3, 4, 5, 6:
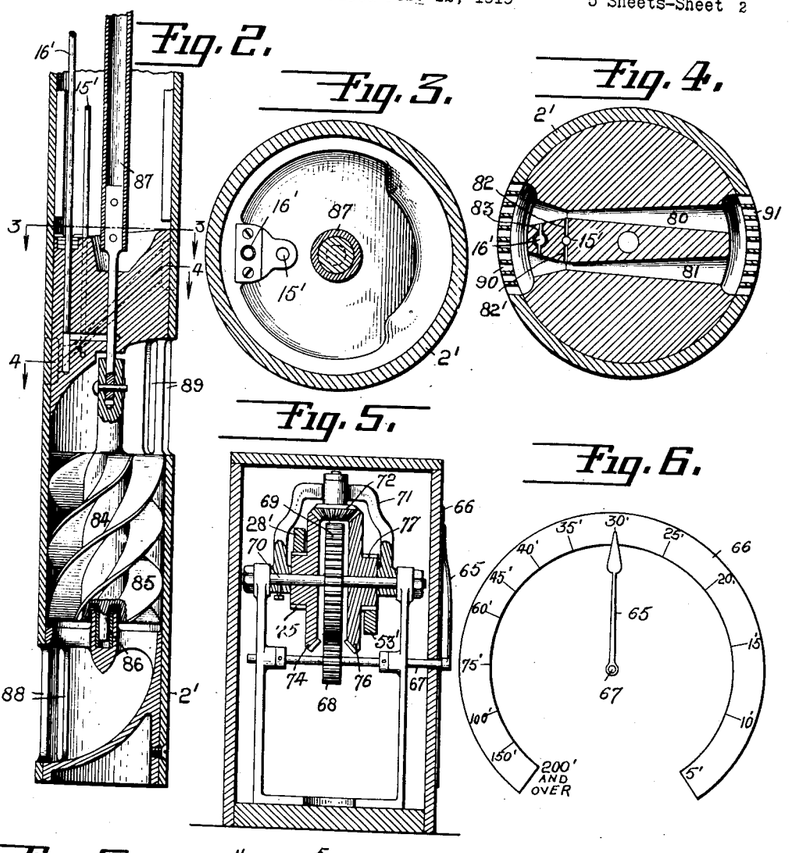
Fig. 2 is a vertical section of a modified form of speed measuring device for use on my invention.
Fig. 3 is a cross section taken approximately on line 3—3 of Fig. 2.
Fig. 4 is a similar section taken on the broken diagonal line 4—4 of Fig. 2.
Fig. 5 is a sectional view of a combined indicator showing the depth of the water and shoal water alarm, the section being taken on line 5—5 of Fig. 7.
Fig. 6 is a face view of the pointer and dial thereof.

In Figs. 2, 3, and 4, a modified form of ship's speed indicator is shown in which the distance recorder is also incorporated. In this form a plurality of Venturi tubes 80 and 81 is positioned diagonally transversely across the tube, as shown in Figs. 2 and 4, pipe connections 15' and 16' being established with the throat and other portion of each tube as before. Pipe 15' is shown as connected to small cross bores 82 and 82' leading into the throat of each tube while a similar pipe 16' is connected through bores 83 to a larger portion of the tubes. Below the Venturi tubes is journalled a suitable ship's log shown as a rotatable member 84 having helicoidal blades or fins 85. Said member is journalled at 86 and is connected to a rotatable shaft 87 leading into the interior of the ship and to any suitable form of recording device. For actuating the ship's log apertures 88 are provided in the lower end of the tube 2'. The water flows upwardly through the vanes 85 and out through the apertures 89. At the same time water also flows into the apertures 90 through the Venturi tubes and out through the apertures 91 as will be readily understood. By employing this form of the invention it is obvious that the indicator 33 described in connection with Fig. 1 may be omitted if desired.

Figure 8:
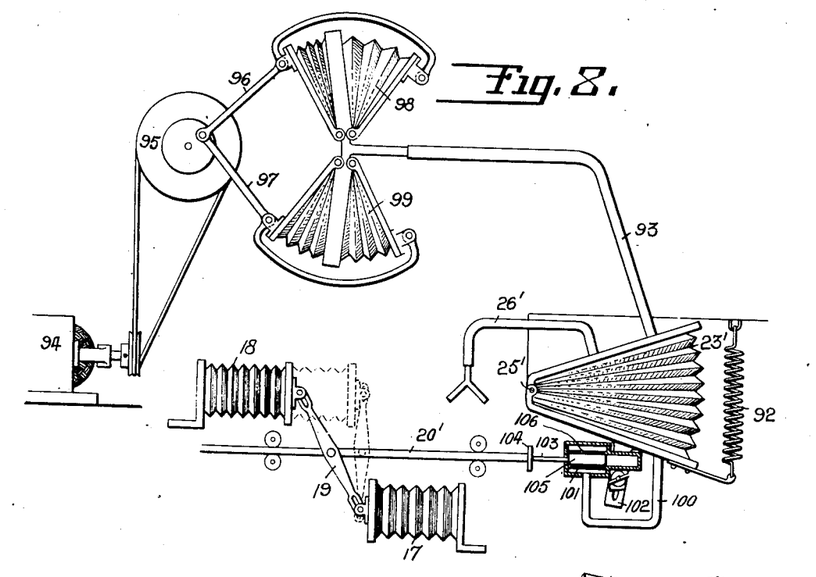
Fig. 8 is a diagrammatic view of a modified form of a portion of the apparatus shown in Fig. 1 in which a live air system is made use of instead of a dead air system for actuating the indicators.

In Fig. 8 I have illustrated an improved form of pressure device for obtaining the speed of the ship in which the pressure of circulating air rather than dead air is made use of. In this figure the bellows 23' correspond to the bellows 23 in Fig. 1. The bellows preferably work against a tension spring 92 so that the amount of expansion of the bellows will furnish an indication of the pressure maintained therewithin. Leading into the bellows is a pipe 93 connected to a continuously driven air pump of any sort. The pump is shown as comprising a motor 94 driving a crank shaft 95 which actuates through cranks 96 and 97 a double bellows 98 and 99 connected to the said pipe 93. A continuous supply of air is thus pumped into the bellows 23'. From the bellows also leads a pipe 100 connected to an exhaust or "bleeding" valve 101. Said valve is secured to the bellows by an arm 102 and has projected therefrom a stem 103 normally resting against a plate 104 on the rod 20'. Said rod 20' corresponds in function to the rod 20 in Fig. 1 and is secured to an intermediate portion of the cross link 19 connecting sylphons 17 and 18. Preferably the point where the valve stem 103 rests on the plate 104 is normally in a vertical line passing through the pivot 25' of the bellows, as shown in Fig. 8. The valve is shown as having a piston 105 which, as it is moved to the right in Fig. 8, uncovers an increasing number of small ports 106 in the wall of the valve. Leading from the bellows is also a pipe 26' which corresponds to pipe 26 in Fig. 1 and leads preferably to the instruments shown in said figure.

The operation of this modification is as follows: Air will be forced continuously through pipe 93 into bellows 23' and as the pressure rises in said bellows the latter expands thereby moving pipe 100, valve 101, and associated parts clockwise about pivot 25' or to the left as viewed in Fig. 8. It will be seen that, with valve stem 103 engaged with plate 104 as shown in Fig. 8, further expansion of bellows 23' results in movement of the ports 106 to the left with respect to piston 105 and as this movement continues more ports are uncovered and the rate of escape of air from said bellows is increased. Expansion of the bellows thus ceases when a sufficient number of ports 106 are uncovered to permit air to escape at the same rate as it is supplied to the bellows. If the position of the plate 104 is moved to the right, for instance by sylphons 17 and 18, it will be seen that the piston 105 will be moved to the right causing the air to leak out faster. This will cause the bellows to collapse somewhat thereby moving the apparatus and valve to a new position of equilibrium in which a less pressure is maintained in the bellows. The prevailing pressure is transmitted to the indicating instruments from a pipe 26' as explained.

Figure 9:
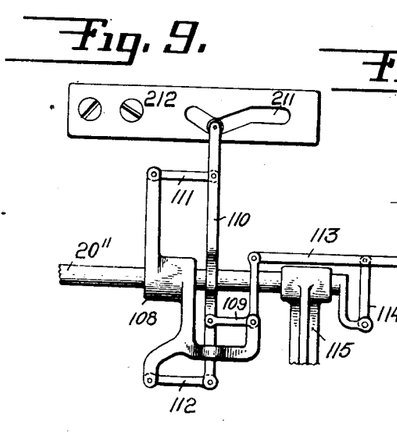
Fig. 9 is a detail of a modified portion of Fig. 8.

In case it is found desirable to position the plate 104 not in direct accordance with the sylphon but according to an involved function of the variation in the pressure I may make use of the arrangement shown in Fig. 9. In this figure the rod 20'' has secured thereto a bracket 108 carrying a plurality of links including the bell crank lever 109 and a long link 110 connected to one end of said bell crank lever. Link 110 is supported for parallel motion by links 111 and 112 and is provided with a roller adjacent one end engaging an irregular shaped slot 211 in plate 212. The bell crank lever is connected through rod 113 to the plate 104, to which rod a link 114 is also connected. Rod 20'' is shown as guided in a bracket 115. It will readily be seen that the movement of plate 104 will be influenced not only by the movement of the rod 20'' but by the configuration of the slot 211 so that any desired movement of the plate 104 may be obtained for given movements of rod 20''.

The operation of my invention briefly is as follows: When the ship is running in mid-ocean where deep water is known to exist, the tube may be entirely withdrawn within the vessel and the propeller speed indicating mechanism shut off, but, of course, the mechanism may be kept in operation all of the time if desired without any harmful results. On nearing the shore the pilot may readily lower the tube through the bottom of the vessel as described, and set the various mechanisms in operation. The velocity of water through the Venturi tube will cause a differential actuation of the sylphons 17 and 18 to move the bellows 23 in proportion to a function of the velocity of the ship. This movement is preferably transmitted to the combined indicator and alarm instrument shown in Fig. 7. At the same time the speed of the propeller shaft or other indication of the power developed by the engines may be transmitted to the said instrument by means of the bellows 45, Venturi tube 50', and a pipe 150''. The position of contact 31 is thus responsive to the speed of the ship while that of contact 56 is responsive to the speed of the engines. As soon as the relation between the two changes by the relative increase in the speed of the engines a contact will be closed, the alarm 57 sounded, and danger signal 59 lighted thus giving warning of shoal water. If desired the alarm may be prevented from acting during the time the ship is accelerating by a delayed action device such as clock 63 set into operation by the signal member 65 or by means such as plate 152 and spring 153 for preventing operation of the alarm until the bellows 45 has brought the air into storage tank 48 up to a predetermined pressure.

Figure 13:
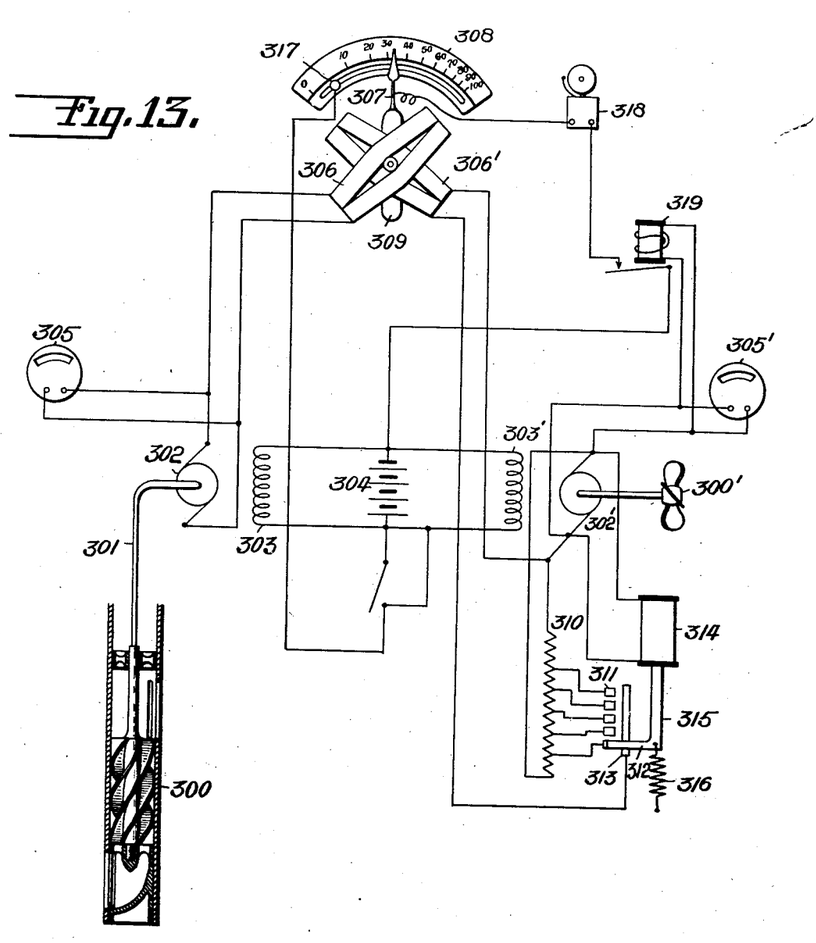
Fig. 13 is a diagrammatic view of a further modification.

In Fig. 13 I have illustrated a form of invention which utilizes electrical instead of pneumatic means. A log 300 similar to the log 84 in Fig. 2 and mounted in substantially the same manner as the last mentioned log drives the armature 302 of a D. C. generator, through a flexible shaft 301, at a speed proportional to the speed of the ship. The field winding 303 of this generator is supplied with sufficient current from a battery 304 to cause saturation of the field. The terminal voltage of the armature 302 will then be in proportion to the speed of the ship through the water. As previously stated, the propeller speed may be employed to furnish an indication of the power consumed in driving the ship. In this modification I have shown a generator 302', 303' in all respects similar to generator 302, 303 except that the armature 302' is driven by the shaft of the propeller 300'. The voltage across the armature 302' will therefore be proportional to the speed of the said shaft and, therefore, to the power consumed in driving the ship. Voltmeters 305 and 305' may be connected across the armatures 302, 302' respectively and may be calibrated to read speed of the ship and speed of the propeller respectively. For any predetermined amount of power to drive the ship the speed of the latter is, as has been previously pointed out, a function of the depth of water, within certain limits. Therefore by connecting each of the armatures 302, 302' to a corresponding one of properly designed angularly spaced fixed coils 306, 306' and by placing a pivoted iron core 309 within these coils the pointer 307 secured to this core, actuated by the differential in voltage of said coils is caused to indicate depth within certain limits on a properly calibrated scale 308. If the speed of the ship in a predetermined depth of water were directly proportional to the speed of the propeller the indications of depth at 308 would be highly accurate for all speeds of the propeller. However, in order to obtain very accurate indications of depth I prefer to connect the coil 306' to the armature 302' through an automatically controlled potentiometer. The latter is shown as comprising a resistance connected across the armature 302' and provided with taps connected to a series of contacts 311. The latter are adapted to be engaged by a contact 312 which engages also a long contact 313. The coil 306' is connected at one end to the armature 302' and at its other end to the contact 313. The position of the contact 312 is controlled by a voltage solenoid 314 to the core 315 of which said contact 312 is secured. The coil 314 is connected across the armature 302' and acts against a spring 316 so that the position of said contact 312 is in accordance with the voltage across the armature 302'. The potentiometer and its connections are preferably so designed as to compensate approximately for two factors, i. e. the variation in the depth resistance curve (see Fig. 12) for different propeller speeds and the departure of the relationship between ship speed and propeller speed from a constant ratio for a constant depth. It is to be understood, of course, that the potentiometer may be omitted if very accurate readings of depth are not desired.

An adjustable contact pin 317 may be provided in a position to be engaged by the pointer 307 to close the circuit of an alarm 318 when the water is too shallow for safe navigation. Preferably the alarm circuit is held open a sufficient length of time after the propeller is started to permit the ship to pick up its speed. This may be accomplished by interposing the front contacts of a retarded relay 319 in the alarm circuit, said relay being connected across the armature 302'.

In accordance with the provisions of the patent statutes, I have herein described the principle of operation of my invention, together with the apparatus, which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined and the invention extends to such use.

Having described my invention, what I claim and desire to secure by Letters Patent is:

1. A shoal water indicator for ships comprising in combination, means actuated in accordance with the speed of the ship, means actuated in accordance with a function of the power developed by the ship and indicating means controlled by the two first mentioned means jointly.

2. A shoal water indicator for ships comprising in combination, means responsive to the speed of the ship, means responsive to a function of the power consumed in driving the ship, indicating means and means actuated by said two first named means whereby a change in the relation of the two first mentioned means causes operation of said indicating means.

3. An indicator for ships comprising a movable member, means for positioning said member in accordance with the rate of movement of the ship through the water, a second movable member, means for positioning said second movable member in accordance with the rate of revolution of a propeller shaft which aids in driving the ship, indicating means, and means actuated by said two first named means for causing operation of said indicating means upon movement of said members.

4. A shoal water indicator for ships comprising in combination, means arranged to be positioned in accordance with the speed of the ship, means arranged to be positioned in accordance with a function of the power developed by the ship and indicating means brought into action by a relatively greater movement of said power means than said speed means.

5. A shoal water indicator for ships comprising in combination, means arranged to be automatically positioned in accordance with the speed of the ship, means arranged to be automatically positioned in accordance with a function of the power developed by the ship, indicating means controlled by the two first mentioned means and means for preventing operation of said indicating means for an interval after the ship's engines are started.

6. In a shoal water indicator for ships, an indicator, a plurality of devices for moving said indicator, means for actuating one of said devices in accordance with the speed of the ship, means for actuating another of said devices in accordance with a function of the power consumed in driving said ship, and connections between said devices and said indicator.

7. In a transmitting measuring device, an expansible container, resilient means for opposing the expansion thereof, a continuous source of air supply connected to said container, a movable member, a graduated escape valve for said container, means governed by the relative position of said container and member for governing the opening of said valve, and a connection for transmitting to a distance the pressure within said container.

8. In a speed transmitting device for ships, an expansible container, resilient means for opposing the expansion thereof, a continuous source of air supply connected to said container, a member arranged to be positioned in accordance with the speed of the ship, an escape valve for said container, means whereby said member is governed by the relative condition of the container and member for opening said valve and means for transmitting the pressure within said container.

9. A shoal water indicator for ships comprising a device responsive to a function of the ship's speed, a second device responsive to substantially the same function of the propeller speed, differential indicating means actuated by said two devices, and means for varying the relation between at least one of said two devices and its actuating member for compensating for varying speeds of the ship.

10. A shoal water indicator for ships comprising a device responsive to a function of the ship's speed, a second device responsive to substantially the same function of the propeller speed, differential indicating means actuated by said two devices, and means for automatically correcting for varying propeller speeds for altering the relation between at least one of said two devices and its actuating member for compensating for varying speeds of the ship.

11. In a shoal water indicating device for ships, an indicator, means for controlling said indicator in accordance with the ship's speed, and means for also controlling said indicator in accordance with a function of the power consumed in driving the ship.

12. In a shoal water indicating device for ships, an indicator, means for rendering said indicator responsive to the speed of the ship, and means for also rendering said indicator responsive to the propeller speed in driving the ship.

13. In a shoal water indicating device for ships, an indicator, means actuated in accordance with the speed of the ship, means actuated in accordance with the power consumed in driving the ship, and differential means for actuating said indicator by both of said first named means.

14. In a shoal water indicating device for ships, indicating means, a movable member, means for controlling said member in accordance with the ship's speed, a second movable member, means for controlling said second member in accordance with a function of the power developed by the ship, and means for causing a relative movement of said members to operate said indicating means.

15. A shoal water indicator for ships comprising in combination, a movable member, means for positioning said member in accordance with the speed of the ship, a second movable member, means for positioning said second movable member in accordance with a function of the power consumed in driving the ship, differential means connecting said members, and a depth indicator actuated by said differential means.

16. A shoal water indicator for ships comprising in combination, a movable member, means for positioning said member in accordance with the speed of the ship, a second movable member, means for positioning said second movable member in accordance with a function of the power consumed in driving the ship, differential means connecting said members, a depth indicator and an alarm actuated by said differential means.

17. A shoal water indicator for ships comprising in combination, a movable member, means for positioning said member in accordance with the speed of the ship, a second movable member, means for positioning said second movable member in accordance with a function of the power consumed in driving the ship, indicating means controlled by the two first mentioned members, and means for preventing operation of said indicating means during the acceleration of the ship.

18. In a device for comparing the speed of a ship with the power consumed, means actuated in accordance with the ship's speed, means actuated in accordance with a function of the power developed by the ship, indicating means controlled by the first two mentioned means jointly, delayed action means for preventing the operation of said indicating means, and means for setting said delayed action means in operation.

19. A shoal water indicator for ships comprising in combination, means positionable in accordance with the speed of the ship, means positionable in accordance with a function of the power developed by the ship, indicating means controlled by the two first mentioned means, and adjustable means for varying the relation between said first two means.

20. In a shoal water indicator for ships, fluid pressure means, means for causing actuation of said fluid pressure means in response to the travel of the ship through the water, a second fluid pressure means, means for causing actuation of said second fluid pressure means by the ship's engines, and differential means for indicating relative variations in the strengths of said two fluid pressure means.

21. A shoal water indicator for ships comprising in combination, means positionable in accordance with the speed of the ship, means positionable in accordance with a function of the power developed by the ship, indicating means, and means for actuating said indicating means upon a relative movement of said two first mentioned means.

22. A shoal water indicator for ships comprising in combination, means responsive to the speed of the ship, means responsive to a function of the power consumed in driving the ship, an indicator, and means for actuating said indicator upon a greater movement of said power means than said speed means.

23. A shoal water indicator for ships comprising in combination, means responsive to the speed of the ship, means responsive to a function of the power developed by the ship, indicating means controlled by said two first mentioned means, and means for preventing operation of said indicating means for an interval after the ship's engines are started.

24. A shoal water indicator for ships, comprising an expansible member positionable in accordance with the speed of the ship, a second expansible member positionable in accordance with a function of the power consumed in driving the ship, indicating means, and means for causing actuation of said indicating means upon a relative movement of said members.

25. A shoal water indicator for ships comprising a movable member, fluid pressure means for actuating said member in accordance with the speed of the ship, a second movable member, fluid pressure means for actuating said second member in accordance with a function of the power consumed in driving the ship, indicating means, and means for causing actuation of said indicating means upon a relative movement of said members.

26. A shoal water indicator for ships comprising an expansible member postionable in accordance with the speed of the ship, a second expansible member positionable in accordance with a function of the power consumed in driving the ship, differential means actuated by said members, and a depth indicator actuated by said differential means.

27. A shoal water indicator for ships comprising a movable member, fluid pressure means for actuating said member in accordance with the speed of the ship, a second movable member, fluid pressure means for actuating said second member in accordance with a function of the power consumed in driving the ship, differential means actuated by said members, and a depth indicator actuated by said differential means.

28. A shoal water indicator for ships comprising an expansible member, fluid pressure means for actuating said member in accordance with the speed of the ship, a second expansible member, fluid pressure means for actuating said member in accordance with the power consumed in driving the ship, indicating means, and means for bringing said indicating means into action upon a relatively greater movement of the second expansible member than said first expansible member.

29. A shoal water indicator for ships comprising an expansible member, fluid pressure means for actuating said member in accordance with the speed of the ship, a second expansible member, fluid pressure means for actuating said second expansible member in accordance with a function of the power consumed in driving the ship, a pair of relatively movable contacts, an indicator in circuit with said contacts and means for causing one of said contacts to approach the other upon a relative movement of said expansible members.

30. A shoal water indicator for ships comprising a movable member positionable in accordance with the speed of the ship, a second movable member positionable in accordance with a function of the power developed by the ship, circuit closing means, means for actuating said circuit closing means in response to movement of one of said members with respect to the other, and an indicator controlled by said circuit closing means.

In testimony whereof I have affixed my signature.

ELMER A. SPERRY.